(12) United States Patent
Hong et al.

(10) Patent No.: US 6,829,502 B2
(45) Date of Patent: Dec. 7, 2004

(54) BRAIN RESPONSE MONITORING APPARATUS AND METHOD

(75) Inventors: Di-an Hong, Inverness, IL (US); Yong Liu, Hoffman Estates, IL (US); Tom Mathew, Skokie, IL (US); Iwona Turlik, Barrington, IL (US); Weinin Xiao, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/158,451

(22) Filed: May 30, 2002

(65) Prior Publication Data

US 2003/0225342 A1 Dec. 4, 2003

(51) Int. Cl.$^7$ ............................. A61B 5/04; H04Q 1/00
(52) U.S. Cl. ................. 600/544; 600/558; 340/825.19; 463/36
(58) Field of Search ................................. 600/544, 558, 600/545; 463/36; 128/924, 925; 340/825.19

(56) References Cited

U.S. PATENT DOCUMENTS

| | | | | | |
|---|---|---|---|---|---|
| 4,013,068 | A | * | 3/1977 | Settle et al. | 600/545 |
| 4,861,154 | A | * | 8/1989 | Sherwin et al. | 600/544 |
| 5,092,343 | A | * | 3/1992 | Spitzer et al. | 128/925 |
| 5,474,082 | A | * | 12/1995 | Junker | 600/545 |
| 5,571,057 | A | * | 11/1996 | Ayers | 463/36 |
| 6,001,065 | A | * | 12/1999 | DeVito | 600/544 |

* cited by examiner

*Primary Examiner*—Eric F. Winakur

(57) ABSTRACT

Brain response signals of a user, such as electroencephalogram signals, and in particular visually evoked potential signals that correspond to predetermined illumination patterns, are detected and utilized to ascertain selection of specific functions and/or actions as desired by that user. Sources of illumination that exhibit such patterns are arranged to physically correspond to indicia of such functions and actions to facilitate knowing selection thereof.

38 Claims, 4 Drawing Sheets

BRAIN RESPONSE MONITORING APPARATUS AND METHOD

TECHNICAL FIELD

This invention relates generally to the monitoring of brain response, and more particularly to the monitoring of visually evoked potential signals.

BACKGROUND

It is well understood that various brain responses can be monitored without need for invasive sensors. For example an individual's electroencephalogram response can be readily monitored through use of available prior art apparatus. Typically the data derived through such monitoring is used to inform various medical diagnostic practices and techniques wherein the data is collected and then later bulk processed to facilitate a corresponding diagnostic study. Fictional stories abound that feature other uses of so-called brain waves, but practical implementations have, for the most part, eluded researchers in this regard.

Various devices are also known in the art that provide and/or require one or more human interfaces to receive user instructions and selections. For example, telephones, televisions, computers, and the like all provide various mechanical and/or audible input mechanisms for such purposes. Such prior art solutions are not fully satisfactory in all application settings, however. Due to limitations with respect to the user themselves, the application context, and/or the mechanism being controlled, such prior art input mechanisms can be partially or wholly ineffective to ensure timely and/or accurate user input and selection.

BRIEF DESCRIPTION OF THE DRAWINGS

The above needs are at least partially met through provision of the brain response monitoring apparatus and method described in the following detailed description, particularly when studied in conjunction with the drawings, wherein.

Figure 1:
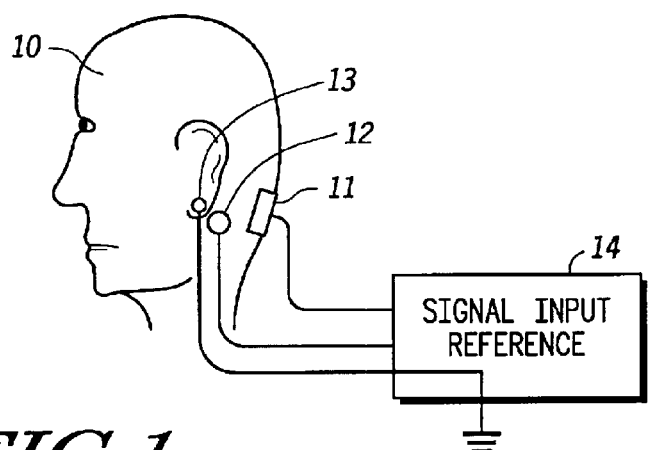
FIG. 1 comprises a block diagram as configured in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a source of illumination (which source is associated with a corresponding pattern such as, in a preferred embodiment, a predetermined rate of flashing) as viewed by an observer will evoke a corresponding brain response. The brain response is monitored to determine when the observer has viewed the source of illumination for at least a predetermined period of time and provide an electronic signal in response thereto. The source of illumination can be comprised of various light sources including light emitting diodes and portions of a pixelated display. Depending upon the embodiment, multiple sources of illumination can be used wherein at least some of the sources have differing corresponding patterns (to thereby facilitate differing corresponding brain responses).

In a preferred embodiment, the brain response can be monitored using electroencephalogram sensors and preprocessing. In particular, the observer's visually evoked potential signals are sensed using electroencephalogram techniques. Such signals are processed using fast Fourier transforms and any resultant corresponding frequency peak noted. For many individuals, such a frequency peak will reliably correlate to a corresponding pattern for the source of illumination.

The visually evoked potential signals for some individuals will not always reliably correlate to a given illumination pattern that predictably accords with the likely response of an average observer. These teachings are nevertheless applicable to such individuals, however, by training the response evaluation and processing function to learn the unique responses of a given individual as correlates to specific illumination patterns. Such learned information is then usable to permit later detection activities with that given individual.

So configured, a user can readily interact with a variety of controllable objects (including everything from computers and communications devices to lamps and coffee makers). One or more sources of illumination are provided in correspondence with the functions and actions to be controlled. Selection of a given function or action can be ascertained by detecting that the visually evoked potential signals of a user match the source of illumination that corresponds to such function or action. If desired, additional selection criteria can be required as well (such as, for example, additional mechanical or audible indicia).

Referring now to FIG. 1, a user 10 has electroencephalogram electrodes 11, 12, and 13 coupled to him or her. As well understood in the art, a ground electrode 13 couples to the user's ear, and a reference signal electrode 12 couples, in this embodiment, to the skin behind the ear. Lastly, the third electrode 11 is positioned near the base of the head on the backside thereof. So positioned, the third electrode 11 is well positioned to facilitate detection of electroencephalogram responses of the user's brain, and in particular visually evoked potential signal brain responses of the user 10. These sensors couple to an EEG data pre-processor 14. Such electrodes and initial signal processing mechanisms are well understood in the art and hence additional details will not be presented here for the sake of brevity and focus.

Figure 2:
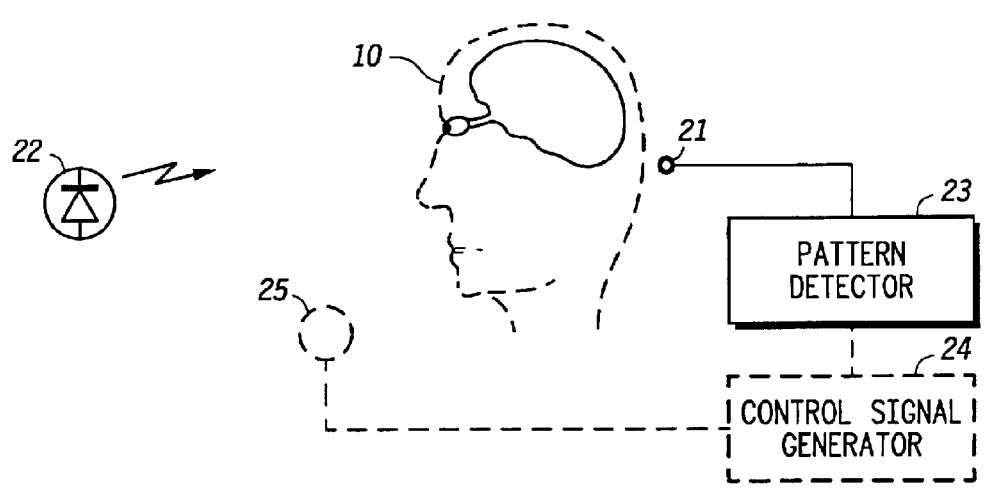
FIG. 2 comprises a block diagram as configured in accordance with various embodiments of the invention.

Referring now to FIG. 2, a pattern detector 23 is coupled to further receive the signals that correspond to the user's brain response. So configured, a source of illumination 22 as viewed by the user 10 will in turn evoke signals in the brain that are readily detectable by the electroencephalogram monitoring apparatus 21. As taught herein, the source of illumination 22 has a pattern associated therewith, and this pattern in turn influences the visually evoked potential signals. By comparing such signals against other predetermined information using the pattern detector 23, one can detect when the user 10 is, in fact, gazing at the source of illumination 22. Detection of such a state in turn can be used to provide for provision of a corresponding electronic signal that can, for example, be used by a control signal generator 24 to facilitate provision of a control signal to some device or function.

As noted, the source of illumination 22 has a pattern associated therewith. For example, the source can have a particular flashing pattern. Pursuant to one approach, the duty cycle of the flashing pattern can be varied (for example, within a range of about 10% to about 90%). Pursuant to another approach (or in combination with the duty cycle approach), the flashing pattern can have a predetermined frequency of, for example, 4 to 80 Hz. Depending upon the application, it would also be possible to provide a pattern characterized by a modulating shifting frequency, wherein the periodicity of flashing varies in a predetermined way over a fixed period of time. Pursuant to yet another approach, the flashing pattern can comprise a pattern of illuminating lights. Other patterns could be utilized as well as desired and as appropriate to a given application.

So configured, the pattern associated with the source of illumination 22 itself imposes a detectable characteristic upon the corresponding visually evoked potential signals of the brain of the user 10. For example, for many users, a source of illumination 22 having a 50 Hz flashing pattern will evoke potential signals having a corresponding 50 Hz frequency peak as detectable through use of fast Fourier transforms. Not all users seem to have a brain response that is as obviously correlated to a given illumination pattern. Nevertheless, even for users with a more individual response, the response will tend to be relatively consistent and predictable, albeit unique, for a given illumination pattern.

Use of such apparatus to detect a given illumination pattern and to respond in some appropriate way will be described below in more detail. Pursuant to some embodiments described below, such detection may be supplemented with other user inputs. To facilitate such embodiments, the control signal generator 24 can also couple to receive a non-brain response using one or more additional user input mechanisms 25 such as, for example, an audible signal transducer (such as a microphone) or a mechanical action transducer (such as a tactile or proximity keypad, cursor controller, switch, or the like).

Figure 3:
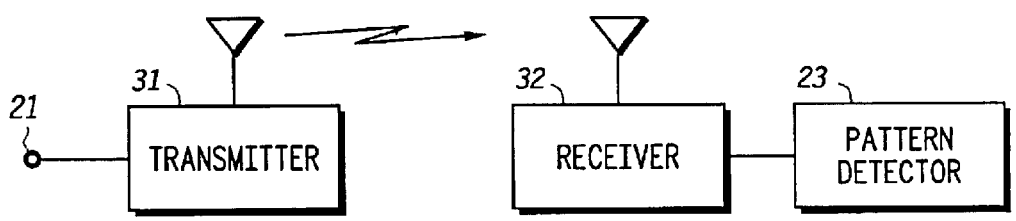
FIG. 3 comprises a block diagram as configured in accordance with yet another embodiment of the invention.

In the embodiments set forth above, the electroencephalogram electrodes are described as being physically tethered to the pre-processing and pattern detection apparatus. If desired, and referring now to FIG. 3, a wireless interface can be used to facilitate greater ease of mobility for the user. For example, the electroencephalogram electrodes (with or without the pre-processing functionality) can couple to a wireless transmitter 31 such as a short or long range radio frequency platform or an infrared light platform. A corresponding receiver 32 can then receive such signals and in turn provide them to the pattern detector 23 as otherwise described above. Various wireless solutions are known and can be readily utilized as described. Therefore additional detailed description need not be provided here.

Figure 4:
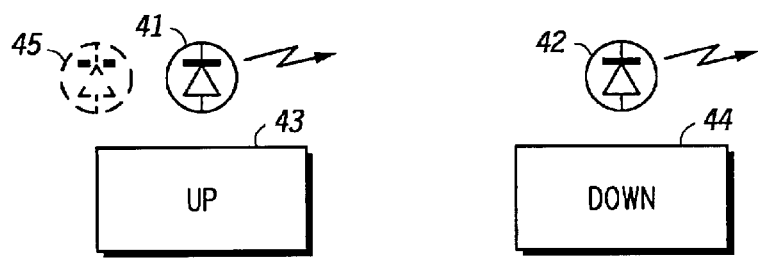
FIG. 4 comprises a schematic diagram as configured in accordance with various embodiments of the invention.

As initially presented above, a single source of illumination will serve to support use of these teachings. In many instances, however, a plurality of illumination sources can be used to good effect. For example, with reference to FIG. 4, a first light emitting diode (LED) 41 can be provided along with a second LED 42. For purposes of this example, it will be presumed that the first LED 41 has a 40 Hz flashing pattern and the second LED 42 has a 50 Hz flashing pattern. Consequently, the visually evoked potential signals of an observer's brain will vary depending upon which LED is presently being directly observed. By associating each LED with a specific function, item, or other desired action, a user can indicate a preference or selection of a given function, item, or action by gazing at the corresponding LED. To provide a simple illustration, FIG. 4 depicts the word "UP" 43 in close proximity to the first LED 41 and a different word "DOWN" 44 in close proximity to the second LED 42. In effect, by merely looking at the word "UP" 43, a user could signal a preference for that function or action because the LED 4 disposed proximal to that alphanumeric indicia will evoke uniquely identifiable brain responses. By detecting such unique brain responses, one can also detect that the user is, in fact, gazing at the corresponding word "UP" 43 and initiate a corresponding control signal in response to such detection.

FIG. 4 can also serve to illustrate yet another pattern variation that can serve in these applications—multiple sources of illumination that flash in a pattern with respect to one another. For example, two LEDs 41 and 45 can be juxtaposed with respect to one another and in proximity to indicia that is indicative of a potential function or action (in this example, the word "UP" 43). Such a pair of LEDs 41 and 45 can then be illuminated in an alternating pattern with respect to one another and this pattern can again be used to uniquely identify when an observer is gazing at the word "UP" 43.

Figure 5:
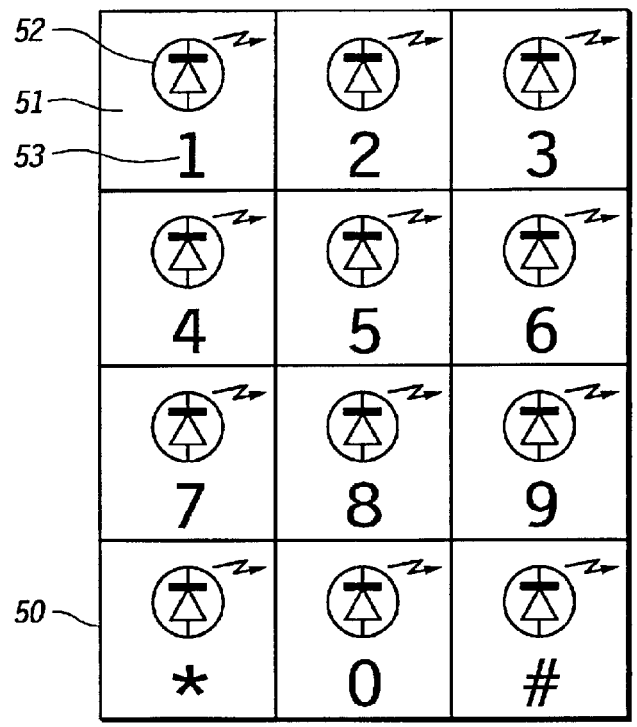
FIG. 5 comprises a schematic diagram as configured in accordance with an embodiment of the invention.

Referring now to FIG. 5, another example will be provided. In this example, a telephone keypad 50 has an LED disposed proximal to each keypad character. For example, in a first keypad area 51, the number "1" 53 occurs in close conjunction to a corresponding LED 52. Each of the LEDs on this keypad 50 has a unique pattern associated therewith. For example, the LED 52 that is disposed proximal to the number "1" 53 can flash at 33 Hz, and that frequency of flashing can be unique amongst the various LEDs on the keypad 50. So configured, by directing one's visual attention to the number "1" 53 (and hence the corresponding area 51 thereabout) the LED 52 positioned proximal to that number 53 will evoke a unique corresponding brain response that can be detected and thereby serve to indicate selection of the number "1" 53 by that user. Such a process can serve, in turn, to allow a user to, for example, dial a telephone number without physically contacting the keypad 50 and without verbalizing any specific information or selections.

Figure 6:
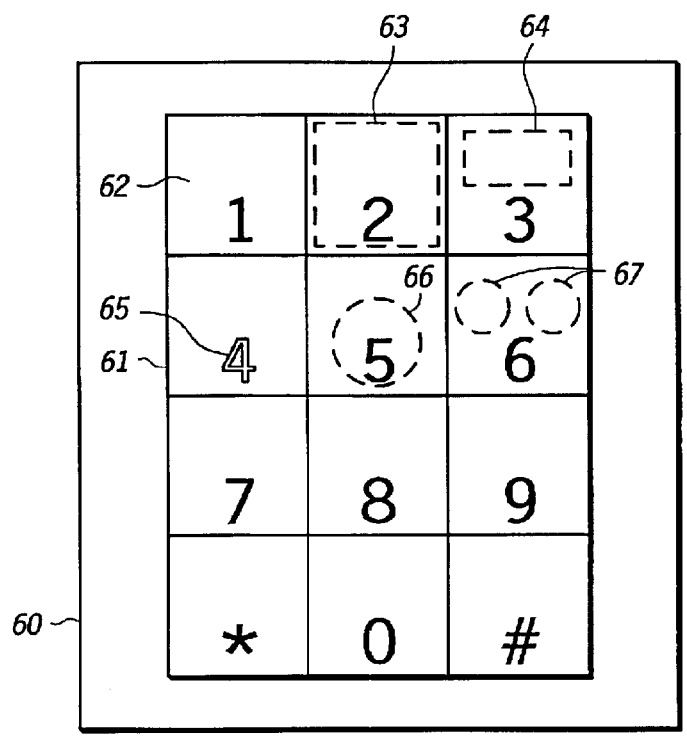
FIG. 6 comprises a schematic diagram as configured in accordance with various embodiments of the invention.

In the embodiments depicted above, the discrete sources of illumination have been illustrated as LEDs. As also noted earlier, however, the sources of illumination can be any of a wide variety of light emitting (or even light reflecting) devices and mechanisms. For example, and referring now to FIG. 6, a pixelated display 60 (such as a cathode ray tube display as well understood in the art) can serve in a similar fashion. In particular, selected portions of the pixelated display can again provide sources of illumination that abide by the same kinds of patterns as have already been suggested above. In FIG. 6, a virtual telephone keypad 61 is presented on the display 60. In conjunction with the various items of numeric or character representations a corresponding source of illumination can be provided in various ways. For example, the entire area 62 surrounding the indicia can comprise the pattern-bearing source of illumination. In the alternative, a lesser area 63 that still surrounds the indicia or even an area 64 that is merely proximal to the indicia will also serve satisfactorily in many applications. Further, if desired, the indicia 65 itself can also serve as the source of illumination (where the pixels that form the indicia are also illuminated in accord with the predetermined pattern). Many of the illumination areas show above have been rectangular in shape, but of course any shape can be used as desired (such as a circular shape 66). Further, and again as desired, multiple sources of illumination 67 for a single corresponding indicia can also be used.

Figure 7:
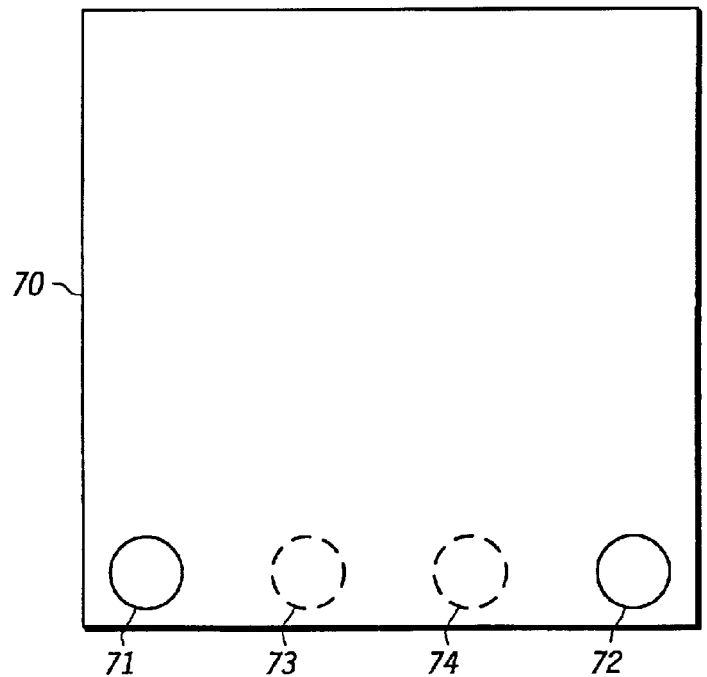
FIG. 7 comprises a schematic diagram as configured in accordance with various embodiments of the invention.

So configured, a pixelated display can convey function and/or action choices to a user and selection of individual choices can be detected by monitoring the brain response of the user. There are various ways in which such approaches can be beneficially used with a pixelated display. For example, and referring now to FIG. 7, a display 70 such as a television display can have a substantial portion thereof used to present ordinary visual content to a user. At the bottom of the display, however (or elsewhere as desired), sources of illumination 71 and 72 can be provided to facilitate selection of choices such as "Volume Up" and "Volume Down." Additional sources 73 and 74 could of course be added as desired to support additional functionality (such as "Channel Up" and "Channel Down").

Figure 8:
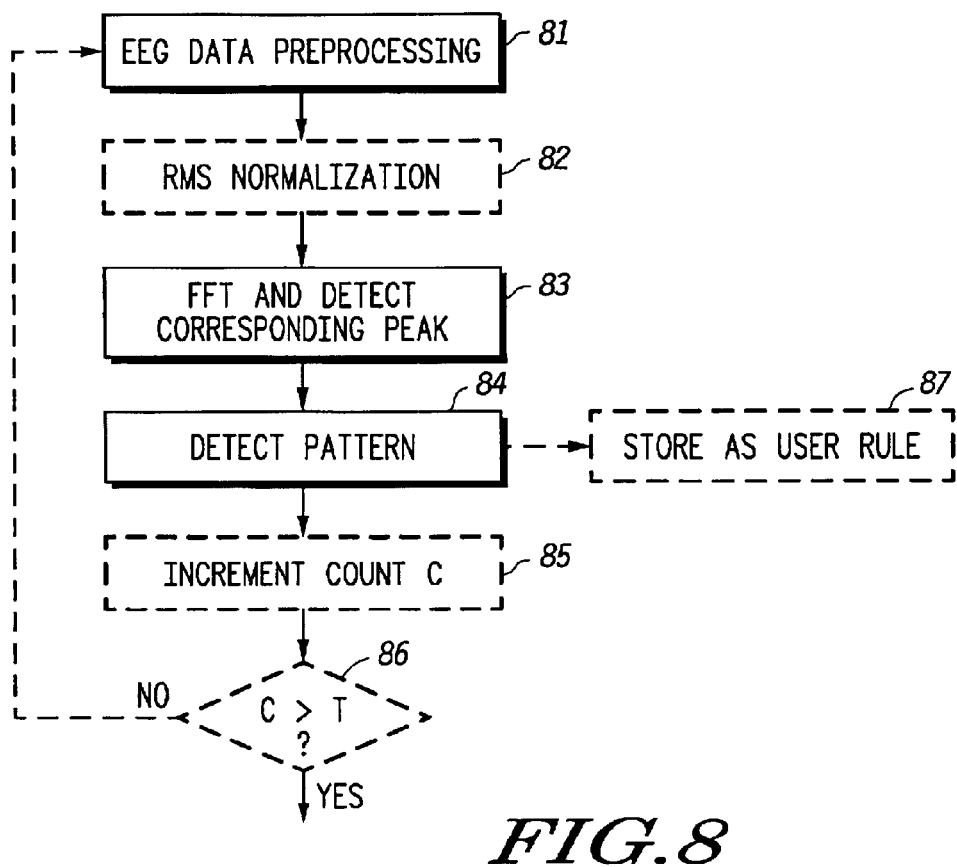
FIG. 8 comprises a flow diagram as configured in accordance with various embodiments of the invention.

There are various ways by which illumination patterns as described or suggested above can be detected and made useful. Referring now to FIG. 8, when the brain responses comprise electroencephalogram information the EEG data will typically be pre-processed 81 (this can involve scaling, limiting, conversion to digital form, and so forth as appropriate to the particular downstream platform(s) being utilized in a given application in accordance with well understood prior art technique). In a preferred embodiment, the signals are then subjected to root mean squared normalization 82. The resultant brain response signals are then processed using fast Fourier transformations to facilitate detecting the corresponding frequency peak for such signals. Detection 84 of a predetermined pattern can then ensue. When a match occurs (within whatever tolerance range that may be appropriate to select for a particular application), a particular pattern has been detected and that match can be used to initiate provision of an electronic signal that so indicates. Such a signal can in turn be used to facilitate initiating or selecting a function or action that correlates to such pattern as explained above.

When a user looks at a display or other item that has one or more sources of illumination such as those described above, it is likely that their gaze will be cast upon such sources prior to any specific decision regarding selection of any given action or function. To mitigate against false positives under such circumstances, if desired, the above process can be supplemented by incrementing 85 a count C (upon detecting a pattern) and then continuing to monitor for subsequent detections of the same pattern. Only when the count C indicates 86 that a sufficient number of sequential confirming detections have been made (such as, for example, three consecutive confirmations) will a selection be confirmed. So configured, a user can review the content and possibilities of a display without prematurely triggering functions and/or actions.

The above described processes can be quite effective when used with individuals who tend to share a common brain response to a given illumination pattern. Some individuals, however, present non-average brain responses to a given pattern. To facilitate use of these embodiments with such individuals, one approach would be to train the process. For example, and with continued reference to FIG. 8, a test subject could be subjected in seriatim fashion to individual known illumination patterns. The resultant brain responses of that subject would then be pre-processed 81, normalized 82, and transformed and peak-detected 83 to identify that subject's particular brain responses to such illumination patterns. That data would then be stored 87 as a user rule(s) for that individual (as used herein, it should be understood that "rule" can refer to any of a variety of items, including discrete items of information, that are otherwise useful when compared against the frequency peak information to facilitate characterizing the brain response as being substantially similar to, or different from, a brain response that would likely correspond to a pattern of interest).

Figure 9:
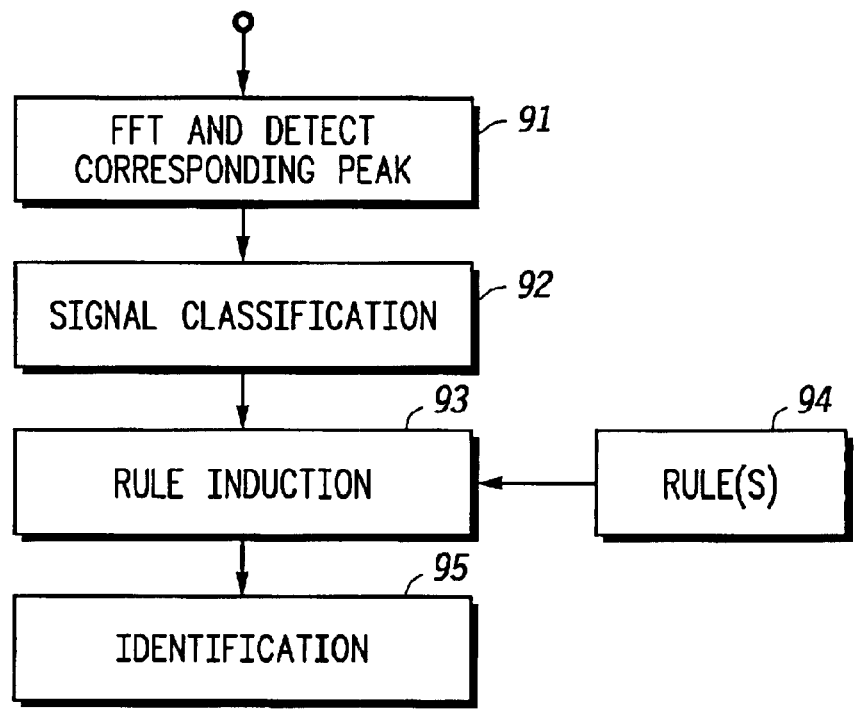
FIG. 9 comprises a flow diagram as configured in accordance with an embodiment of the invention.

Referring now to FIG. 9, during ordinary use, the brain responses of the tested individual would again be transformed and peak-detected 91. The resultant information may then be classified 92 to ascertain it's general or specific characteristics and/or type. Then, as appropriate, the previously developed rule or rules 94 would be used to facilitate rule induction 93 that in turn allows identification 95 of the brain response and the corresponding illumination pattern to which it corresponds. So configured, even an individual with completely unique brain responses would nevertheless be able to enjoy the benefits of the embodiments presented above.

Figure 10:
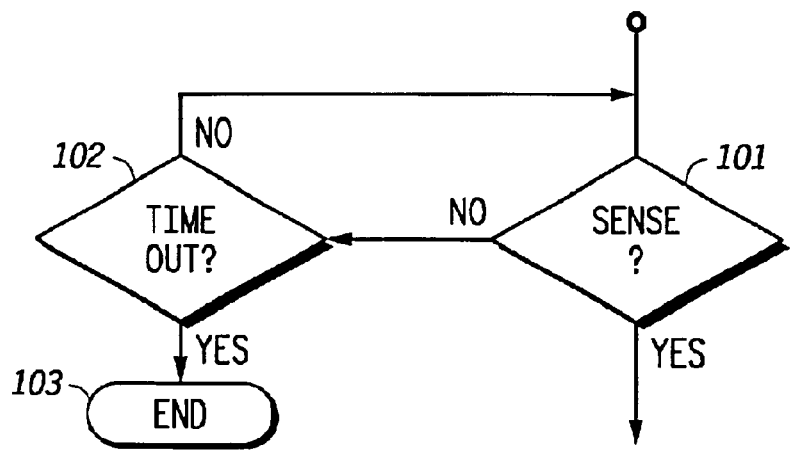
FIG. 10 comprises a detail flow diagram as configured in accordance with another embodiment of the invention.

Although the embodiments presented above permit significant control capability to a user through gaze alone, there may be times when supplemental user input can facilitate either speed and/or accuracy of the control process. When so desired, supplemental user input(s), such as a voice recognition mechanism and/or a mechanical input such as a switch or keypad can be used. By this approach, and referring now to FIG. 10, after an illumination pattern has been detected, the control signal generator 24 can monitor further for a necessary non-brain response input from the user. When such a supplemental response is detected 101, the provision of a corresponding electronic signal can continue as described above. When no such supplemental response is detected 101, and when a predetermined period of time expires 102, this portion of the process can conclude 103.

For example, voice recognition control of a given computer can be inhibited except when the user is looking at a voice-recognition-enabled indicia on the computer display (which indicia of course has a source of illumination having a corresponding pattern associated therewith). The user can speak without worrying that such speech will incorrectly trigger some function or activity. By simply looking at the indicia, however, the speech recognition control mechanism can be enabled and the user's speech then processed accordingly.

Through use of these various embodiments, the brain response of a user is monitored to ascertain illumination patterns that the user is looking at essentially in real time. These patterns in turn can correspond in predetermined ways with specific functions or actions, which functions and actions are essentially selectable by the user by the mere act of looking. In a very real sense, these embodiments enable "vision recognition" as a viable human-machine interface mechanism that will accommodate a wide variety of tasks, including but not limited to alphanumeric character entry, appliance operating state selection, and system, site, or network navigation, to name a few.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of providing an electronic signal that corresponds to a desired action, comprising:
   providing at least one source of illumination, which source of illumination has a corresponding pattern associated therewith;
   monitoring a user's brain response;
   detecting via the user's brain response when the user has viewed the at least one source of illumination for at least a predetermined period of time, at least in part by determining when at least two of a plurality of signal conditions that each correspond to the pattern have been detected, and providing the electronic signal in response thereto.

2. The method of claim 1 wherein providing at least one source of illumination includes providing a plurality of sources of illumination.

3. The method of claim 2 wherein providing a plurality of sources of illumination includes providing a plurality of sources of illumination wherein at least some of the sources of illumination have a substantially unique pattern associated therewith.

4. The method of claim 2 wherein providing a plurality of sources of illumination includes providing a plurality of sources of illumination wherein a group of the sources of illumination together form the corresponding pattern.

5. The method of claim 1 wherein providing at least one source of illumination, which source of illumination has a corresponding pattern associated therewith includes providing at least one source of illumination, which source of illumination has a corresponding flashing pattern associated therewith.

6. The method of claim 5 wherein providing at least one source of illumination, which source of illumination has a corresponding flashing pattern associated therewith includes providing a corresponding flashing pattern having a predetermined duty cycle.

7. The method of claim 6 wherein providing a corresponding flashing pattern having a predetermined duty cycle includes providing a corresponding flashing pattern having a predetermined duty cycle within a range of about 10% to about 90%.

8. The method of claim 5 wherein providing at least one source of illumination, which source of illumination has a corresponding flashing pattern associated therewith includes providing a source of illumination having a corresponding flashing pattern having a frequency of approximately 4 to 80 cycles per second.

9. The method of claim 1 wherein providing at least one source of illumination, which source of illumination has a corresponding pattern associated therewith includes providing a corresponding pattern comprising a pattern of illuminating lights.

10. The method of claim 1 wherein providing at least one source of illumination includes providing at least one discrete source of illumination.

11. The method of claim 1 wherein providing at least one source of illumination includes providing the at least one source of illumination using at least a portion of a pixelated display.

12. The method of claim 1 wherein providing at least one source of illumination, which source of illumination has a corresponding pattern associated therewith includes providing at least one source of illumination, which source of illumination has at least two corresponding patterns associated therewith.

13. The method of claim 1 wherein providing at least one source of illumination includes providing an indicia of the desired action in proximity to the at least one source of illumination.

14. The method of claim 1 wherein detecting via the user's brain response when the user has viewed the at least one source of illumination includes using a fast Fourier transform to detect a signal condition corresponding to the pattern.

15. The method of claim 14 wherein detecting the signal condition corresponding to the pattern includes detecting a peak that corresponds to the pattern.

16. The method of claim 15 wherein detecting a peak that corresponds to the pattern includes detecting a peak that corresponds to a frequency that corresponds to a frequency at which the source of illumination is flashing.

17. The method of claim 1 wherein detecting via the user's brain response when the user has viewed the at least one source of illumination includes detecting a unique brain response pattern for the user that corresponds to the pattern.

18. The method of claim 1 wherein determining when at least two of a plurality of signal conditions have been detected includes determining when at least three of the signal conditions within a predetermined period of time have been detected.

19. The method of claim 1 and further comprising:
   providing at least another source of illumination, which at least another source of illumination has a different corresponding pattern associated therewith;
   detecting via the user's brain response when the user has viewed the at least another source of illumination for at least a predetermined period of time and providing another electronic signal in response thereto.

20. The method of claim 19 and further comprising actuating the desired action upon detecting the electronic signal followed by the another electronic signal.

21. The method of claim 1 and further comprising actuating the desired action upon detecting the electronic signal as followed by another electronic signal.

22. The method of claim 21 and further comprising monitoring for a non-brain response user signal that causes provision of the another electronic signal.

23. The method of claim 22 wherein the non-brain response user signal comprises an audible signal.

24. The method of claim 22 wherein the non-brain response user signal comprises a mechanical action.

25. The method of claim 1 wherein monitoring a user's brain response includes monitoring a user's electroencephalogram response.

26. The method of claim 25 wherein monitoring a user's electroencephalogram response includes monitoring a user's visual evoked potential signals.

27. A device comprising:
   a light pattern brain response detection sensor;
   a pattern detector operably coupled to the light pattern brain response detection sensor and having an output that provides at least a first signal indicating when a light pattern brain response of a user at least likely corresponds to a predetermined light pattern at least two of a plurality of times;
   a control signal generator operably coupled to the pattern detector and having an output that provides a control signal comprising a correlation between the predetermined light pattern and a predetermined action.

28. The device of claim 27 wherein the light pattern brain response detector sensor comprises an electroencephalogram sensor.

29. The device of claim 27 wherein the light pattern brain response comprises a visual evoked potential signal.

30. The device of claim 29 wherein the predetermined light pattern comprises a frequency peak.

31. The device of claim 30 wherein the pattern detector comprises fast Fourier transformation means for detecting a frequency peak of the user's light pattern brain response.

32. The device of claim 29 wherein the pattern detector comprises:

normalization means for normalizing the user's light pattern brain response to provide normalized light pattern brain responses;

fast Fourier transformation means for processing the normalized light pattern brain responses to provide transformed light pattern brain responses;

pattern recognition means for comparing the transformed light pattern brain responses against at least one previously determined pattern that corresponds to a predetermined light pattern brain response.

33. The device of claim 32 wherein the previously determined pattern comprises at least one rule that correlates to a specific user.

34. The device of claim 32 wherein the pattern recognition means compares the transformed light pattern brain responses against a plurality of previously determined patterns, wherein at least some of the previously determined patterns each correspond to a different predetermined light pattern brain response.

35. The device of claim 27 and further comprising a source of at least one light pattern.

36. The device of claim 35 wherein the source comprises at least one light emitting diode.

37. The device of claim 35 wherein the source provides a light pattern comprising a flashing pattern.

38. The device of claim 37 wherein the flashing pattern has a frequency of approximately 4 to 80 cycles per second.

* * * * *